United States Patent [19]

Tsai et al.

[11] 4,045,197

[45] Aug. 30, 1977

[54] GLASSMAKING FURNACE EMPLOYING HEAT PIPES FOR PREHEATING GLASS BATCH

[75] Inventors: Yih-Wan Tsai, Pittsburgh; John E. Sensi, Arnold; Vincent I. Henry, New Kensington, all of Pa.

[73] Assignee: PPG Industries, Inc., Pittsburgh, Pa.

[21] Appl. No.: 721,244

[22] Filed: Sept. 8, 1976

[51] Int. Cl.² .............................................. C03B 1/00
[52] U.S. Cl. .......................................... 65/27; 65/134; 65/335; 165/105
[58] Field of Search ............. 65/65 A, 17, 99 A, 134, 65/182 R, 27, 337, 346, 356, 335; 165/105

[56] References Cited

U.S. PATENT DOCUMENTS

| | | | |
|---|---|---|---|
| 3,185,554 | 5/1965 | Sweo et al. | 65/17 |
| 3,429,122 | 2/1969 | Pravda et al. | 60/39.51 |
| 3,607,190 | 9/1971 | Penberthy | 65/134 |
| 3,788,832 | 1/1974 | Nesbitt et al. | 65/134 |
| 3,819,350 | 6/1974 | Pellett et al. | 65/134 |
| 3,880,639 | 4/1975 | Bodner et al. | 65/134 |
| 3,884,292 | 4/1975 | Pessolano et al. | 165/105 X |

OTHER PUBLICATIONS

"Cooling with Heat Pipes," by F. J. Lavoie *Machine Design*, Aug. 6, 1970, pp. 86-91.

*Primary Examiner*—Arthur D. Kellogg
*Attorney, Agent, or Firm*—E. Kears Pollock

[57] ABSTRACT

An apparatus and method are provided for recovering waste heat from the exhaust of a combustion-heated glass melting furnace and transferred by heat pipes to an enclosure in which incoming glass batch materials are preheated prior to being fed to the furnace for melting. The batch materials are efficiently preheated with the waste heat without permitting direct contact between the exhaust effluent and the batch materials so that the entrainment and discharge of batch dust with the effluent is avoided.

7 Claims, 2 Drawing Figures

GLASSMAKING FURNACE EMPLOYING HEAT PIPES FOR PREHEATING GLASS BATCH

BACKGROUND OF THE INVENTION

1. Field of the Invention

This invention relates to the melting of raw materials to make molten glass and particularly relates to the modification and use of glass melting furnaces which employ combustion as a source of heat for melting glass batch materials. In particular, this invention relates to improvements in waste heat recovery systems for preheating glass batch materials.

2. Brief Description of the Prior Art

Glassmaking furnaces employing combustion as a significant or primary source of heat for melting glass batch materials have in the past included facilities for recovering waste heat from the gaseous effluence exhausted from such furnaces and transferring a portion of that heat to unmelted glass batch materials before feeding them into the glass melting furnace. U.S. Pat. No. 3,788,832 to Nesbitt et al and U.S. Pat. No. 3,880,639 to Bodner et al both relate to the preheating of agglomerated glass batch materials by direct contact with a gaseous effluent being exhausted from a glass melting furnace. While pulverulent glass batch materials also could be contacted directly by hot exhaust gases to preheat them, direct contact by rapidly flowing gases would tend to fluidize the fine batch materials causing segregation of the batch ingredients according to particle size and also causing the discharge of extremely fine particulate batch materials with the exhaust gases. In order to overcome such particulate discharge it would be necessary to provide dust bags, cyclones or some like pollution abatement device.

U.S. Pat. No. 3,185,554 to Sweo et al is related to a method of preheating glass batch materials by independent heating means other than exhausted effluent so that there is no unpredictable relationship between varying amounts of waste heat and the amount of heat provided for preheating unmelted batch material. There is, of course, no direct contact between the heating means of Sweo et al and the effluent exhausted from the furnace disclosed in that patent.

One can contemplate systems for recovering waste heat from the exhausted effluent of a glass melting furnace and using that heat to preheat glass batch materials which do not provide for direct contact between the exhausted effluent and the glass batch materials. Those familiar with the glassmaking art may readily contemplate such systems as being analogous to the regenerative or recuperative systems employed for preheating incoming combustion air with heat recovered from exhausted effluent. There are drawbacks, however, which would be associated with such systems. For one, the efficiency of heat transfer for such a system would be relatively low. For another, the material handling problems of passing a solid, powdery material through or over the same devices would serve as heat capacitors to hold the heat acquired from exhausted effluent would be difficult to operate without encountering, clogging and sticking of glass batch materials on the hot surfaces, particularly at the initiation of a batch input cycle.

The present invention contemplates heat transfer method and apparatus for utilizing waste heat to preheat glass batch materials while avoiding direct contact between effluent gases and powdery or agglomerated glass batch materials.

Summary of the Invention

A glass melting furnace having burners to supply heat to the furnace by combustion to melt and react glass batch materials to make molten glass is provided with an exhaust system for exhausting effluent from the furnace. The effluent, comprising hot gases of combustion products and reaction products, results from the burning of fuel and the reaction of batch materials inside the furnace. The furnace is further provided with a facility for feeding unmelted glass batch materials, including recycled glass or cullet, into the furnace. A system is provided for transferring heat from the hot, effluent gases being exhausted from the furnace to the unmelted glass batch materials before they are fed into the furnace. The present improvement includes, as an essential feature, a plurality of heat pipes which extend into thermal communication with an interior, effluent gas-conveying portion of the exhaust system and also extend into intimate thermal communication with a glass batch holding facility which is a part of the system for feeding glass batch materials to the furnace. The heat pipes which are employed provide thermal communication between the exhaust system and the glass batch feeding system without providing for any direct gas flow path between the two.

The glass batch holding facility is that part of the glass batch feeding system where the glass batch is preheated. It comprises an enclosure which is preferably thermally insulated so that any heat received by the glass batch materials is not readily given up to the surrounding environment. It is a facility through which glass batch materials pass after being formulated and compounded and prior to being held for direct feeding into the glass melting furnace itself. The holding facility may comprise a simple hopper to which glass batch materials are fed and through which they pass by gravity effect. When employing such a holding facility, the ends of a plurality of heat pipes extend into the hopper so that glass batch materials pile about the heat pipes and are in direct contact with them. It is desirable to minimize the period during which preheated batch is held prior to charging or feeding it to the glassmaking furnace in order to prevent an unnecessary loss of heat from the batch. Thus, when heating the batch directly in a feed hopper it is desirable to position the heat pipes in the hopper at a location close to the batch feeding location.

A preferred glass batch holding facility comprises a tunnel which includes inside means for conveying glass batch materials along the length of the tunnel from a feed end to a discharge end. The conveying means may be a conveyor belt, a plurality of conveyor belts, such as metal chain belts, or it may be a single or plurality of vibratory feeder trays. In either event, the ends of a plurality of heat pipes are in contact with, or closely spaced from, the conveying means. The heat pipes are distributed over a substantial region along the length of the conveying means, which length is sufficient for transferring heat from the heat pipes to glass batch materials residing on and passing along the conveying means. The heat to be transferred is to be sufficient to substantially increase the temperature of the glass batch materials. The tunnel enclosure is preferably provided with thermal insulation in order to retain whatever heat is transferred into it by the heat pipes and to avoid the unnecessary loss of heat from the glass batch materials to the surrounding environment.

The heat pipes employed each comprise a container, usually metallic, having an inner surface that is a capillary structure essentially saturated with a vaporizable liquid-working fluid. The heat pipe acts to transfer heat from the exhaust system to the glass batch-containing enclosure by vaporizing the working fluid causing it to expand and move through a vapor channel to an end of the pipe located within the batch-containing enclosure. There the vapor releases its heat to its surroundings, including the glass batch materials, and is condensed as a liquid into the capillary structure which serves as a wick to convey the condensed liquid back to the vaporizing end of the heat pipe located in the exhaust system. Since a heat pipe acts to transfer heat almost isothermally, the heat pipes are efficient for transferring heat at a substantial rate when a significant external temperature difference is imposed across their lengths between the exhaust system and the batch feeding system.

The kind of heat pipes which may be employed in the practice of this invention are heat pipes of known general design as generally described in a number of publications, typical of which is an article entitled "Cooling With Heat Pipes" by Francis J. Lavoie, in MACHINE DESIGN, issue date Aug. 6, 1970. Several patents describe the use of heat pipes. For example, U.S. Pat. No. 3,884,292 to Pessolano et al describes a device for recovering heat from the flue pipe or exhaust stack of a domestic or industrial heating system and using that heat to assist in heating the space that is generally heated by the combustion heater to which the heat pipe assembly is attached. In practicing this invention fins similar to those shown on the ends of the heat pipes in the device of Pessolano et al may be mounted on the ends of the heat pipes which extend into the furnace exhaust system. Such an arrangement enhances the transfer of heat between the exhausted effluent gases and the heat pipes.

The heat pipes employed in the present invention have the following specific characteristics:

The heat pipe shell or tube may be made of any conventional corrosion-resistant material that has a high heat conductivity and has good mechanical strength at the temperature encountered during use. Useful heat pipes for use in this invention may employ shells of 1808 stainless steel, 310 stainless steel, nickel alloys sold under the trademark INCONEL by International Nickel Co. or the like.

The wicks of the heat pipes employed in this invention may be porous or groove type and may be machined, sintered or coated inside the shells of the heat pipes. Any conventional heat pipe wick would appear to be satisfactory.

A substantial number of materials are believed suitable for use as working fluids. Included as possible working fluids are organic heat transfer fluids such as halogenated hydrocarbons, particularly common chlorinated hydrocarbon heat transfer liquids. It is also possible to use liquid metals, such as potassium or sodium as working fluids. The liquid metals are preferred for use at temperatures above about 1000° F. (540° C.) and the organic materials are useful at lower temperatures up to about 1200° F. (650° C.).

This invention may be further appreciated in reference to the accompanying drawings.

DESCRIPTION OF THE PREFERRED EMBODIMENTS

Figure 1:
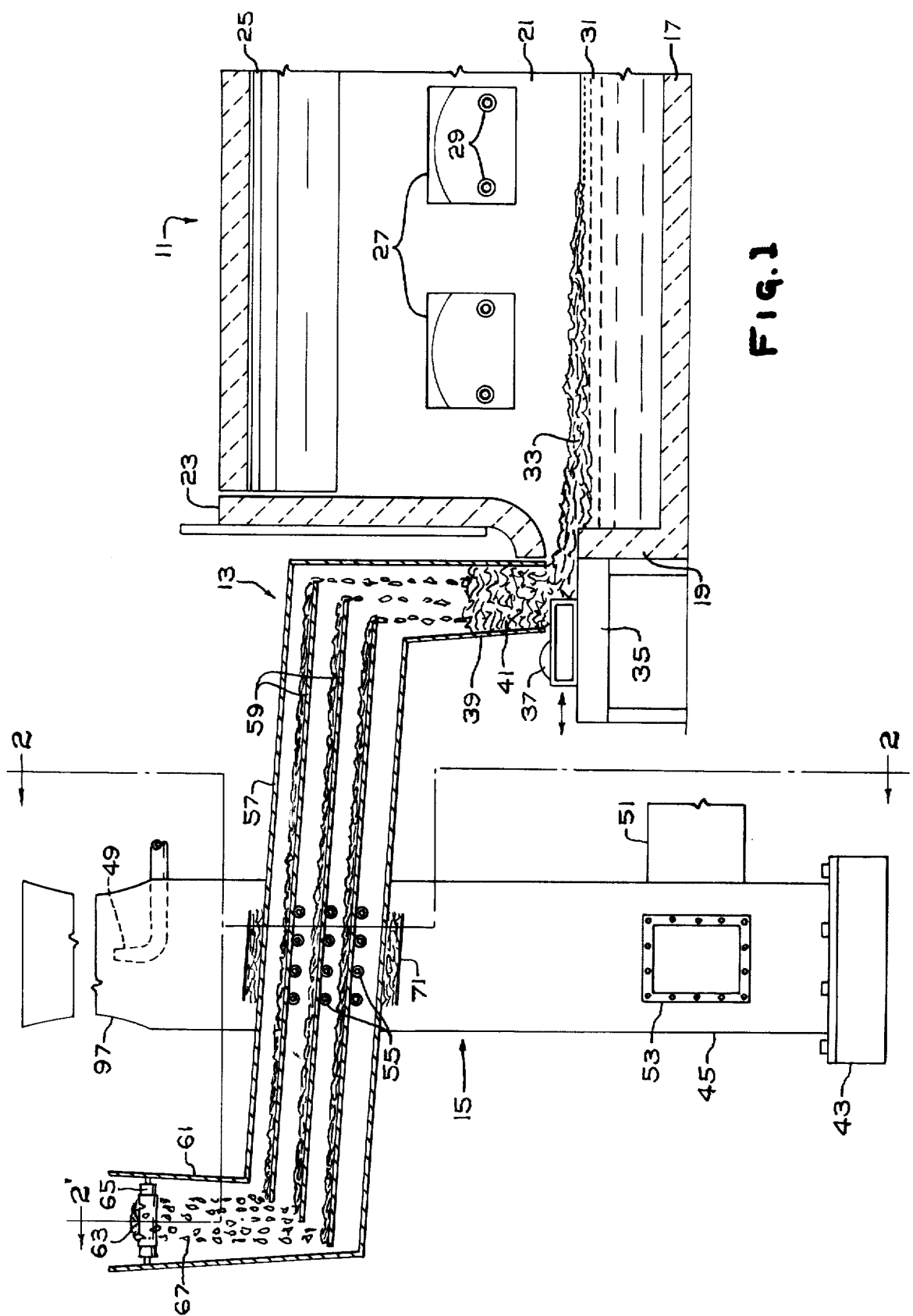
FIG. 1 is a schematic longitudinal elevation of a portion of a glassmaking facility showing a portion of the batch feeding facility in a glass melting furnace in cross section and the exhaust stack portion of an exhaust system connected thereto through a regenerator not shown.
Figure 2:
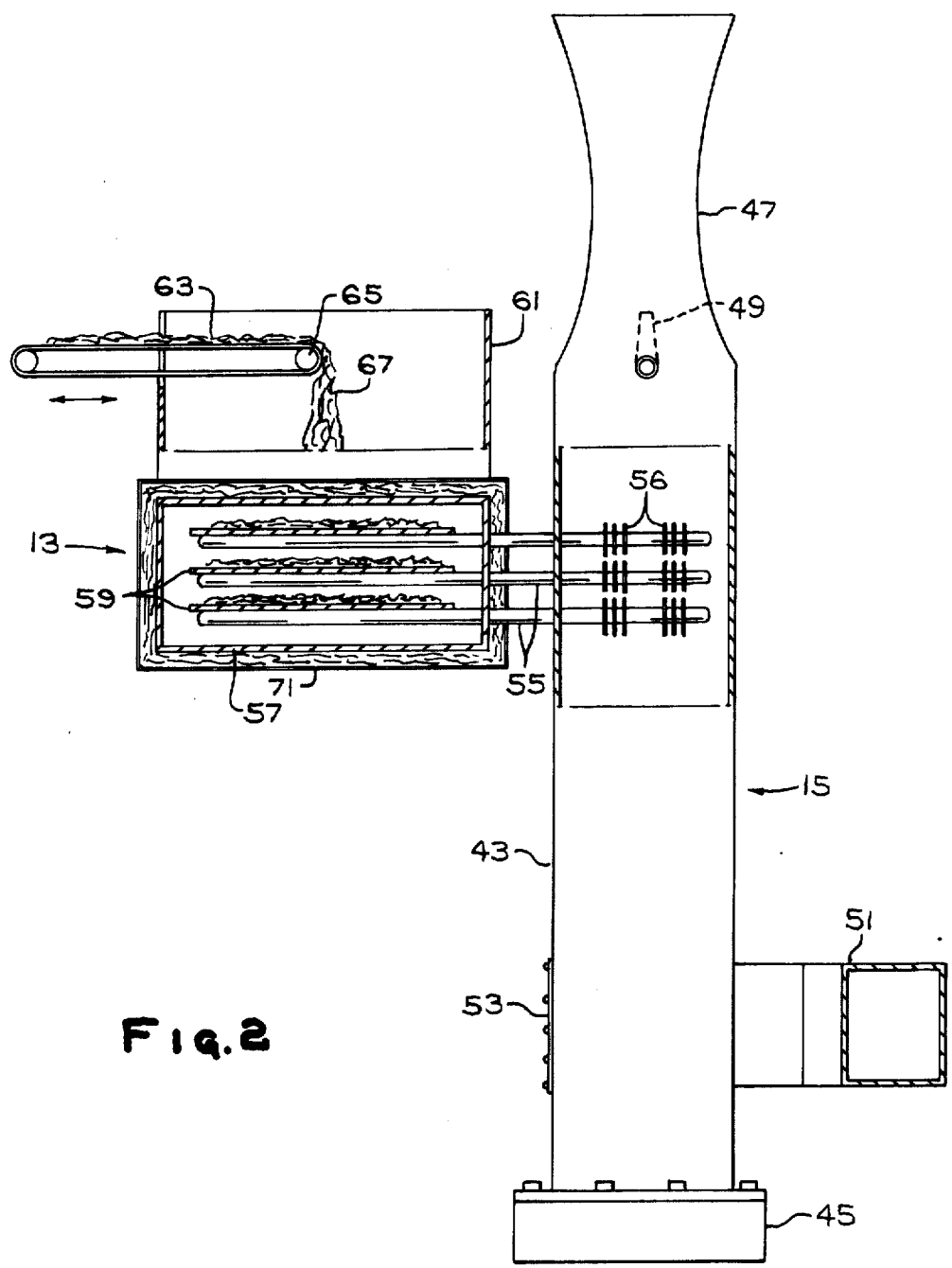
FIG. 2 is a schematic transverse or lateral elevation of a portion of the glassmaking facility shown in FIG. 1 seen partially in cross section along as viewed at section lines 2—2 and 2—2'.

Referring now to FIGS. 1 and 2, there is seen a glassmaking facility embodying the features of this invention which provide for efficiently transferring heat from the exhaust system of the facility to the batch feeding system of the facility in order to preheat glass batch material utilizing waste heat of the effluent from the furnace.

A glass melting furnace 11 has associated with it a glass batch feeder and supply system 13 and is connected through regenerators or a recuperator (not shown) to an exhaust stack of ejector for exhausting products of combustion and other gaseous and vapor effluent from the furnace. The glass melting furnace includes a tank or furnace bottom 17, a back basin wall 19 and side walls 21 forming an open-topped container for holding a pool of molten glass. The furnace further includes a suspended front wall 23 and a crown 25 which, along with the upper portions of the side walls 21, form an open bottomed structure enclosing a headspace. A series of ports 27 extend through the upper portion of the side walls 21 and burners 29 for introducing fuel into the headspace are mounted inside the ports 27. The ports are connected through portnecks to a regenerator or recuperator (not shown) which is a part of the furnace exhaust system 15.

The furnace contains a pool of molten glass 31 upon which floats a layer of unmelted glass batch materials 33. The batch materials are fed into the furnace continuously or intermittently by a batch feeder. The illustrated batch feeder 13 includes an intermittent feeder having a batch-supporting ledge 35 upon which rests a reciprocating pusher plate or bar 37. It is, of course, understood that a continuous feeder could alternatively be employed with this invention. The pusher bar is connected to conventional motor and timer devices which are used to reciprocate the pusher bar at a rate sufficient to push batch materials off the ledge 35 into the furnace to balance the removal of molten glass from the furnace for forming and maintaining the pool of molten glass 31 in the furnace at a desired level. The batch feeding system further includes a feed hopper 39 which holds batch material 41 that is allowed to fall by gravity onto the ledge 35 to be pushed into the furnace. The remainder of the batch feeding facility 13, including the portion for preheating glass batch materials will be described further along with its interrelation to the exhaust system.

The exhaust system 15 includes regenerators or a recuperator of conventional design which are connected to an exhaust stack 43 resting on a base 45. The exhaust stack 43 may be a simple, tall stack or may be an ejector-boosted stack as illustrated having a Venturi section 47 or throat with an ejector 49 mounted in it. A typical conventional ejector exhaust stack to which this invention may be applied is that constructed by the firm of Morgan-Isley, Inc. for use with regenerator furnaces. The exhaust system includes an exhaust duct 51 connecting the secondary checker chamber of a regenerator or a regenerator flue to the stack 43. The stack 43 is usually provided with an access for cleaning that, during operation, is covered with a plate 53.

A plurality of heat pipes 55 are mounted through a wall of the exhaust stack 45. The ends of the heat pipes 55 extending into the inside, hot, effluent gas-carrying space of the exhaust stack may be provided with heat transfer fins 56. The ends of the heat pipes 55 opposite the ends extending into the exhaust stack are extended into a batch holding enclosure 57. This enclosure 57 is a tunnel-like enclosure having a batch materials conveyor 59 inside it. The conveyor may be a single or series of conveyor belts such as metal chain belts or a single or series of plate-like inclined trays of vibratory feed conveyors. If conveyor belts are employed, some or all of the heat pipes may serve as rollers upon which the belt can ride. Tubular heat pipes are readily adapted for use as rollers by rotatably mounting them through the walls of the enclosure 57 and exhaust stack 45. In the event that a vibratory conveyor such as shown is employed, the heat pipes may be fixed by welding or mechanical fasteners to the inclined trays. The walls of the enclosure and exhaust stack are then provided with openings through which the heat pipes extend that are large enough to accommodate the vibration of the heat pipes as they vibrate along with the vibratory conveyor trays.

The batch feeding system further includes an inlet hopper 61. A conventional belt conveyor having a belt 63 running on rolls 65 is used to convey glass batch materials 67 from a batch mixer or a like source of mixed batch materials to the inlet hopper 61. Batch materials 67 (which may be either pellets or other agglomerates or pulverulent materials) are deposited into the inlet hopper 61 and fall through it onto the conveyor 59. As the batch materials advance along the conveyor, they are preheated by receiving heat from the heat pipes 55. The heat is largely retained by the batch materials since the conveyer is housed in the enclosure 57 which is preferably insulated by thermal insulation 71. The preheated batch is deposited from the conveyer 59 into the pile of batch materials 41 in the feed hopper 39. From there, the preheated batch materials are fed into the glass melting furnace 11 and melted to make molten glass which can then be discharged from the furnace and formed as flat glass, bottles or other useful articles.

The following examples describe experiments which serve as the basis for projecting the expected benefits of this invention. While these experiments do not represent, in combination, the full preferred embodiments of this invention, they provide insight regarding design parameters that are considered valuable for design of a system to fit a typical glassmaking furnace of any given size.

An exhaust stack is fitted with a burner to exhaust a stream of gas at a rate of about 5500 standard cubic feet per hour (SCFH) at a temperature of about 2000° F. (1090° C.). A heat pipe assembly comprising a bundle of 23 INCONEL nickel alloy heat pipes in an array of three rows of five and two rows of four pipes is mounted on the stack with one end of each pipe 12 inches (30 cm) inside the stack. Each heat pipe is 30 inches (75 cm) long and ¾ inch (1.8 cm) outside diameter. Fins, each 2 inches (5 cm) outside diameter are welded onto the pipe. Near the end of the pipe inserted into the stack the fins are spaced 6 inches (15 cm) apart, while at the other end, the fins are spaced 3 inches (7.5 cm) apart. Each of the pipes on the first row of tubes (bottom row closest the burner) contain metallic sodium as a working fluid. The remaining pipes contain metallic potassium as a working fluid. The ends of the pipes opposite those inside the stack extend 12 inches (30 cm) inside an enclosure for heating air. The air heating enclosure is connected at its inlet to an air blower having an electric preheater associated with it. Connected to the outlet of the enclosure is a duct leading to an air dryer for drying and preheating agglomerated glass batch in pellet form. The dryer includes a metal mesh conveyor for conveying the pellets through it.

During operation, air preheated to about 145° F. (60° C.) is directed through the enclosure as hot exhaust gases pass through the stack. The preheated air is supplied at various rates ranging from 4500 to 8500 SCFH. The air is further heated to about 1050° F. (570° C.) as it passes the heat pipe assembly. Peak heat recovery of about 47 percent is achieved at an air flow of 6500 SCFH. The ends of all heat pipes, except for those of the uppermost row, were at about the same temperature indicating excellent heat transfer although the pipes in the uppermost row may have dried out due to inadequate liquid transfer by their wicks. The system worked effectively to dry the batch pellets and to preheat them.

In a second experiment a single heat pipe is mounted in the exhaust system of an operating glassmaking furnace. The stack temperature at the location at which the heat pipe is mounted is about 1100° F. (595° C.). A water cooled calorimeter is connected to the heat pipe to determine the rate of heat removal. During operation, a heat transfer rate of about 15000 Btu/hour (15.8 × 10$^6$ Joule/hour) is achieved.

While this invention has been described with reference to particularly preferred embodiments, those skilled in the art will appreciate that variations and modification may be made which are within the scope of the concept contemplated by the inventors and defined by the claims which follow.

We claim:

1. In a method of melting glass batch materials in a combustion-heated, continuous, glass melting furnace to yield glass and combustion exhaust gases, wherein batch materials are continuously fed to the furnace and molten glass discharged therefrom and wherein the exhaust gases are employed to preheat batch materials prior to feeding them to the furnace, the improvement which comprises
   isolating the batch materials during preheating from the exhaust gases
   transferring heat from the exhaust gases to the batch materials through at least one heat pipe wherein a heat pipe working fluid is vaporized by heat of the exhaust gases and then condensed by giving up heat to the batch materials.

2. The method of melting glass batch materials according to claim 1 wherein heat is transferred through the heat pipe to the glass batch materials by surrounding an end of the heat pipe with flowable pulverulent batch materials and permitting the batch materials to contact and flow past the end of the heat pipe.

3. The method of melting glass batch materials according to claim 1 wherein heat is transferred through the heat pipe to the glass batch materials by providing thermal contact between an end of the heat pipe and a thermally conductive glass batch conveying means and conveying glass batch materials past the heat pipe by the glass batch conveying means.

4. In a glassmaking apparatus comprising a combustion-heated, glass melting furnace, means for exhausting combustion gases, means for feeding glass batch materials to the furnace and means for discharging glass from the furnace, wherein means are provided for heating glass batch materials prior to feeding them to the furnace using heat from the combustion gases being exhausted from the furnace, the improvement which comprises an enclosure surrounding said glass batch feeding means isolated from said combustion gas exhaust means, and at least one heat pipe extending at one end into said combustion gas exhaust means and extending at its other end into said batch feeding means enclosure.

5. The glassmaking apparatus according to claim 4 wherein said enclosure is thermally insulated.

6. The glassmaking apparatus according to claim 4 wherein said heat pipe is mounted in direct thermal communication with a glass batch conveying means of said feeding means.

7. The glassmaking apparatus according to claim 6 wherein said glass batch conveying means is a vibratory feeder and the heat pipe is mounted at one end to a tray thereof.

* * * * *